(12) United States Patent
Kuo et al.

(10) Patent No.: US 12,030,276 B2
(45) Date of Patent: Jul. 9, 2024

(54) FOLDABLE GLASS ARTICLE INCLUDING AN OPTICALLY TRANSPARENT POLYMERIC HARD-COAT AND METHODS OF MAKING THE SAME

(71) Applicant: CORNING INCORPORATED, Corning, NY (US)

(72) Inventors: Kuan-Ting Kuo, Chubei (TW); Robert Lee Smith, III, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 541 days.

(21) Appl. No.: 16/970,144

(22) PCT Filed: Feb. 6, 2019

(86) PCT No.: PCT/US2019/016859
§ 371 (c)(1),
(2) Date: Aug. 14, 2020

(87) PCT Pub. No.: WO2019/160723
PCT Pub. Date: Aug. 22, 2019

(65) Prior Publication Data
US 2020/0398530 A1    Dec. 24, 2020

Related U.S. Application Data

(60) Provisional application No. 62/630,475, filed on Feb. 14, 2018.

(51) Int. Cl.
*B32B 17/10* (2006.01)
*B32B 7/12* (2006.01)
(Continued)

(52) U.S. Cl.
CPC .............. *B32B 17/10* (2013.01); *B32B 7/12* (2013.01); *B32B 17/10018* (2013.01);
(Continued)

(58) Field of Classification Search
None
See application file for complete search history.

(56) References Cited

U.S. PATENT DOCUMENTS

2011/0217541 A1* 9/2011 Shimano .................. C09D 7/62
428/323
2013/0209796 A1* 8/2013 Yamada ............... C08G 77/045
428/339

(Continued)

FOREIGN PATENT DOCUMENTS

CN     103158309 A     6/2013
CN     104105598 A     10/2014
(Continued)

OTHER PUBLICATIONS

English machine translation of JP2009-084327 (2009).*
(Continued)

*Primary Examiner* — Kenneth J Stachel
(74) *Attorney, Agent, or Firm* — Jeffrey A. Schmidt

(57) ABSTRACT

A glass article including an ultra-thin glass layer and an optically transparent polymeric hard-coat layer having a pencil hardness of 8H or more bonded to the ultra-thin glass layer. The optically transparent polymer hard-coat layer may include an organic polymer material or an aliphatic or aromatic hexafunctional urethane acrylate. In some embodiments, the glass article may have an impact resistance defined by the capability of the glass article to avoid failure at a pen drop height that is 2 times or more than that of a control pen drop height of the ultra-thin glass layer without the optically transparent polymeric hard-coat layer, where the pen drop height and the control pen drop height are measured according to the Pen Drop Test. In some embodiments, the glass article may survive a bend radius of 5 mm or less.

11 Claims, 8 Drawing Sheets

(51) Int. Cl.
    *C09D 175/04*     (2006.01)
    *C09D 183/04*     (2006.01)

(52) U.S. Cl.
    CPC .. *B32B 17/10091* (2013.01); *B32B 17/10137* (2013.01); *B32B 17/10165* (2013.01); *B32B 17/10174* (2013.01); *C09D 175/04* (2013.01); *C09D 183/04* (2013.01); *B32B 2250/02* (2013.01); *B32B 2307/412* (2013.01); *B32B 2307/536* (2013.01); *B32B 2307/558* (2013.01); *B32B 2307/732* (2013.01); *B32B 2457/20* (2013.01); *Y10T 428/31598* (2015.04); *Y10T 428/31663* (2015.04)

(56) References Cited

U.S. PATENT DOCUMENTS

| | | | |
|---|---|---|---|
| 2014/0050909 A1 | 2/2014 | Choi et al. | |
| 2015/0119497 A1* | 4/2015 | Matsui | C09D 133/14 523/400 |
| 2015/0210588 A1* | 7/2015 | Chang | C03C 17/32 428/220 |
| 2015/0252210 A1* | 9/2015 | Kang | C08J 7/044 428/217 |
| 2016/0002103 A1 | 1/2016 | Wang et al. | |
| 2021/0206145 A1 | 7/2021 | Chu et al. | |

FOREIGN PATENT DOCUMENTS

| | | | |
|---|---|---|---|
| CN | 104736609 A | | 6/2015 |
| CN | 114326304 A | * | 4/2022 |
| JP | 2009084327 A | * | 4/2009 |
| JP | 2011132296 A | * | 7/2011 |
| JP | 2012-035431 A | | 2/2012 |
| JP | 2013-111949 A | | 6/2013 |
| TW | 201609902 A | | 3/2016 |
| TW | 201728545 A | | 8/2017 |
| WO | 2017/123899 A1 | | 7/2017 |

OTHER PUBLICATIONS

English machine translation of JP2011-132296 (2011).*
English machine translation CN114326304 (2022).*
Dow Corning® 2634 Coating (2013).*
International Search Report and Written Opinion of the International Searching Authority; PCT/US2019/016859; dated May 16, 2019; 11 Pages; European Patent Office.
Chinese Patent Application No. 201980023649.6, Office Action, dated Jun. 27, 2022, 15 pages, (8 pages of English Translation and 7 pages of Original Copy); Chinese Patent Office.
Search Report for Taiwan Invention Patent Application No. 108104563, dated Aug. 22, 2022, 1 page (English Translation Only); Taiwanese Patent Office.

* cited by examiner

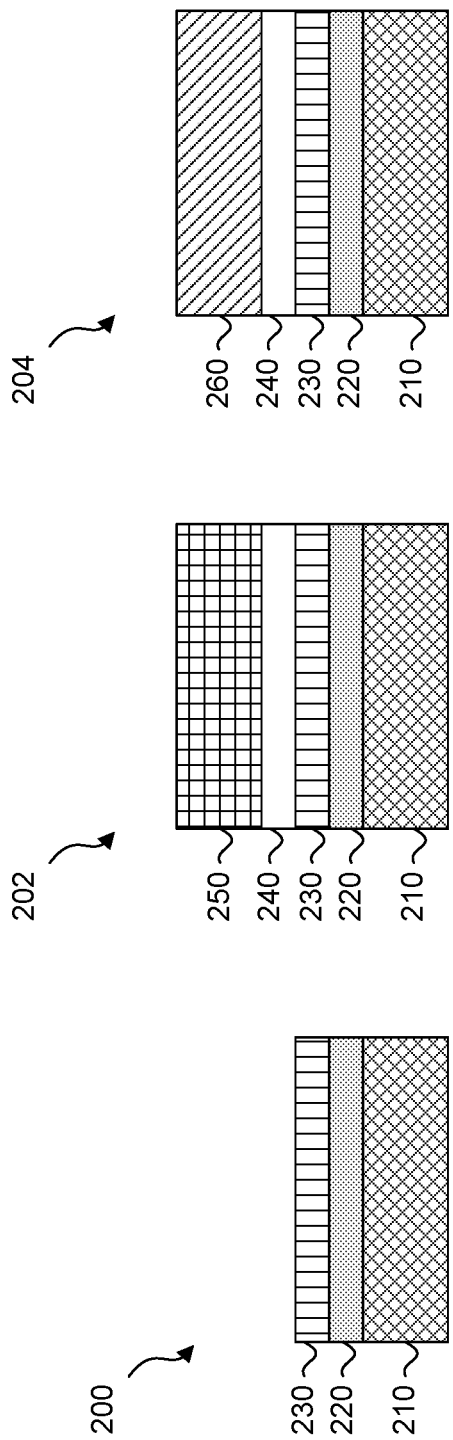

FOLDABLE GLASS ARTICLE INCLUDING AN OPTICALLY TRANSPARENT POLYMERIC HARD-COAT AND METHODS OF MAKING THE SAME

CROSS-REFERENCE TO RELATED APPLICATIONS

This application is a national stage entry of International Patent Application Serial No. PCT/US2019/016859, filed on Feb. 6, 2019, which in turn, claims the benefit of priority under 35 U.S.C. § 119 of U.S. Provisional Application Ser. No. 62/630,475 filed on Feb. 14, 2018, the contents of each of which are relied upon and incorporated herein by reference in their entireties.

BACKGROUND

Field

The present disclosure relates to cover substrates for consumer products, such as cover substrates for protecting a display screen. In particular, to cover substrates for consumer devices including a flexible component, such as a flexible display screen.

Background

A cover substrate for a display of an electronic device protects a display screen and provides an optically transparent surface through which a user can view the display screen. Recent advancements in electronic devices (e.g., handheld and wearable devices) are trending towards lighter devices with improved reliability. These trends include reducing the weight of different components of these devices, including protective components, such as cover substrates.

Also, consumer electronic industries have been focusing on turning wearable and/or flexible concepts into consumer products for years. Recently, thanks to continuous development and improvement of plastic films, plastic-based cover substrates for devices have demonstrated some success in the market. However, the intrinsic drawbacks of using plastic cover substrates remain, such as low moisture and/or oxidation resistibility and low surface hardness, which can lead to device failure during use. The use of a plastic substrate for its the flexibility, may in some situations, increase weight, reduce optical transparency, reduce scratch resistance, reduce puncture resistance, and/or reduce thermal durability for a cover substrate.

Therefore, a continuing need exists for innovations in cover substrates for consumer products, such as cover substrates for protecting a display screen. The need for such innovations includes cover substrates for consumer devices including a flexible component, such as a flexible display screen.

BRIEF SUMMARY

The present disclosure is directed to cover substrates, for example flexible cover substrates for protecting a flexible, foldable, or sharply curved component, such as a display component, including a hard-coat layer that does not negatively affect the flexibility or curvature of the component while also protecting the component from damaging mechanical forces. The flexible cover substrate may include a flexible glass layer and an optically transparent polymeric hard-coat layer bonded to the flexible glass layer for providing scratch resistance and providing impact and/or puncture resistance.

Some embodiments are directed to a glass article including an ultra-thin glass layer, an optically transparent adhesive layer disposed on the ultra-thin glass layer, and an optically transparent polymeric hard-coat layer disposed on the optically transparent adhesive layer, the optically transparent polymeric hard-coat layer having a pencil hardness of 8H or more. Where the glass article has an impact resistance defined by the capability of the glass article to avoid failure at a pen drop height that is 2 times or more than that of a control pen drop height of the ultra-thin glass layer without the optically transparent polymeric hard-coat layer, the pen drop height and the control pen drop height being measured according to the Pen Drop Test. And where the glass article has a bend radius of 5 millimeters (mm) or less.

Some embodiments are directed to a method of making a glass article, the method including disposing an optically transparent adhesive layer on an ultra-thin glass layer and disposing an optically transparent polymeric hard-coat layer on the optically transparent adhesive layer, the optically transparent polymeric hard-coat layer having a pencil hardness of 8H or more. Where the glass article has an impact resistance defined by the capability of the glass article to avoid failure at a pen drop height that is 2 times or more that of a control pen drop height of the ultra-thin glass layer without the optically transparent polymeric hard-coat layer, the pen drop height and the control pen drop height being measured according to the Pen Drop Test. And where the glass article has a bend radius of 5 mm or less.

Some embodiments are directed to an article including a cover substrate including an ultra-thin glass layer, an optically transparent adhesive layer disposed on the ultra-thin glass layer, and an optically transparent polymeric hard-coat layer disposed on the optically transparent adhesive layer, the optically transparent polymeric hard-coat layer having a pencil hardness of 8H or more. The glass article having an impact resistance defined by the capability of the glass article to avoid failure at a pen drop height that is 2 times or more that of a control pen drop height of the ultra-thin glass layer without the optically transparent polymeric hard-coat layer, the pen drop height and the control pen drop height being measured according to the Pen Drop Test. And the glass article having a bend radius of 5 mm or less.

In some embodiments, the article according to the preceding paragraph may be a consumer electronic product, the consumer electronic product including a housing having a front surface, a back surface and side surfaces, electrical components at least partially within the housing, the electrical components including a controller, a memory, and a display at or adjacent the front surface of the housing, and the cover substrate, where the cover substrate is disposed over the display or forms at least a portion of the housing.

In some embodiments, the glass article according to embodiments of any of the preceding paragraphs may be devoid of a layer disposed over the optically transparent polymeric hard-coat layer having a pencil hardness greater than that of the optically transparent polymeric hard-coat layer.

In some embodiments, the glass article according to embodiments of any of the preceding paragraphs may have an impact resistance defined by the capability of the glass article to avoid failure at a pen drop height that is 3 times or more than that of the control pen drop height of the ultra-thin glass layer without the optically transparent polymeric hard-coat layer.

In some embodiments, the glass article according to embodiments of any of the preceding paragraphs may have a bend radius of 3 mm or less.

In some embodiments, the optically transparent polymeric hard-coat layer according to embodiments of any of the preceding paragraphs may define a topmost exterior surface of the glass article.

In some embodiments, the optically transparent polymer hard-coat layer according to embodiments of any of the preceding paragraphs may have a thickness in a range of 10 micrometers (microns, μm) to 120 microns.

In some embodiments, the optically transparent polymer hard-coat layer according to embodiments of any of the preceding paragraphs may include a material selected from the group of: an organic polymer material and an aliphatic or aromatic hexafunctional urethane acrylate. In some embodiments, the optically transparent polymer hard-coat layer according to embodiments of any of the preceding paragraphs may include an inorganic-organic hybrid polymeric material. In some embodiments, the inorganic-organic hybrid polymeric material may include polymerized monomers including an inorganic silicon-based group. In some embodiments, the inorganic-organic hybrid polymeric material may be a silsesquioxane polymer.

In some embodiments, the optically transparent polymer hard-coat layer according to embodiments of any of the preceding paragraphs may include an organic polymer material. In some embodiments, the optically transparent polymer hard-coat layer including an organic polymer material may have a thickness in a range of 80 microns to 120 microns.

In some embodiments, the optically transparent hard-coat layer according to embodiments of any of the preceding paragraphs may include an aliphatic or aromatic hexafunctional urethane acrylate. In some embodiments, the optically transparent hard-coat layer including an aliphatic or aromatic hexafunctional urethane acrylate material may have a thickness in a range of 10 microns to 60 microns.

In some embodiments, the optically transparent polymer hard-coat layer according to embodiments of any of the preceding paragraphs may be a single monolithic layer.

In some embodiments, the optically transparent adhesive layer according to embodiments of any of the preceding paragraphs may have a thickness in a range of 5 microns to 30 microns.

In some embodiments, the ultra-thin glass layer according to embodiments of any of the preceding paragraphs may be a non-strengthened glass layer.

Some embodiments are directed to a glass article including an ultra-thin glass layer and an optically transparent polymeric hard-coat layer bonded to the optically transparent adhesive layer, the optically transparent polymeric hard-coat layer having a pencil hardness of 8H or more and including a material selected from the group of: an organic polymer material and an aliphatic or aromatic hexafunctional urethane acrylate. And the glass article has a bend radius of 5 mm or less.

In some embodiments, the glass article according to the preceding paragraph may be devoid of a layer disposed over the optically transparent polymeric hard-coat layer having a pencil hardness greater than that of the optically transparent polymeric hard-coat layer.

In some embodiments, the optically transparent polymeric hard-coat layer according to embodiments of any of the previous two paragraphs may define a topmost exterior surface of the glass article.

In some embodiments, the optically transparent polymer hard-coat layer according to embodiments of any of the previous three paragraphs may have a thickness in a range of 10 microns to 120 microns.

In some embodiments, the glass article according to embodiments of any of the four previous paragraphs may have an impact resistance defined by the capability of the glass article to avoid failure at a pen drop height that is 2 times or more than that of a control pen drop height of the ultra-thin glass layer without the optically transparent polymeric hard-coat layer, the pen drop height and the control pen drop height being measured according to the Pen Drop Test.

In some embodiments, the glass article according to embodiments of any of the five previous paragraphs may have a bend radius of 3 mm or less.

In some embodiments, the optically transparent hard-coat layer according to embodiments of any of the previous six paragraphs may include an organic polymer material. In some embodiments, the optically transparent polymer hard-coat layer including an organic polymer material may have a thickness in a range of 80 microns to 120 microns. In some embodiments, the optically transparent hard-coat layer according to embodiments of any of the previous six paragraphs may include an aliphatic or aromatic hexafunctional urethane acrylate. In some embodiments, the optically transparent hard-coat layer including an aliphatic or aromatic hexafunctional urethane acrylate material may have a thickness in a range of 10 microns to 60 microns.

In some embodiments, the optically transparent polymer hard-coat layer according to embodiments of any of the previous seven paragraphs may be a single monolithic layer.

In some embodiments, the glass article according to embodiments of any of the previous eight paragraphs may include an optically transparent adhesive layer having a thickness in a range of 5 microns to 30 microns.

Some embodiments are directed to a method of making a glass article, the method including bonding an optically transparent adhesive layer to an ultra-thin glass layer and bonding an optically transparent polymeric hard-coat layer to the optically transparent adhesive layer, the optically transparent polymeric hard-coat layer comprising a pencil hardness of 8H or more. Where the optically transparent polymer hard-coat layer includes a material selected from the group of: an organic polymer material and an aliphatic or aromatic hexafunctional urethane acrylate. And where the glass article has a bend radius of 5 mm or less.

Some embodiments are directed to an article including a cover substrate including an ultra-thin glass layer, an optically transparent polymeric hard-coat layer bonded to the optically transparent adhesive layer, the optically transparent polymeric hard-coat layer comprising a pencil hardness of 8H or more. Where the optically transparent polymer hard-coat layer includes a material selected from the group of: an organic polymer material, and an aliphatic or aromatic hexafunctional urethane acrylate. And where the glass article has a bend radius of 5 mm or less.

In some embodiments, the article according to the preceding paragraph may be a consumer electronic product, the consumer electronic product including a housing having a front surface, a back surface and side surfaces, electrical components at least partially within the housing, the electrical components including a controller, a memory, and a display at or adjacent the front surface of the housing, and the cover substrate, where the cover substrate is disposed over the display or forms at least a portion of the housing.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 2A illustrates a first test sample configuration. FIG. 2B illustrates a second test sample configuration. FIG. 2C illustrates a third test sample configuration.

DETAILED DESCRIPTION

Figure 1A:
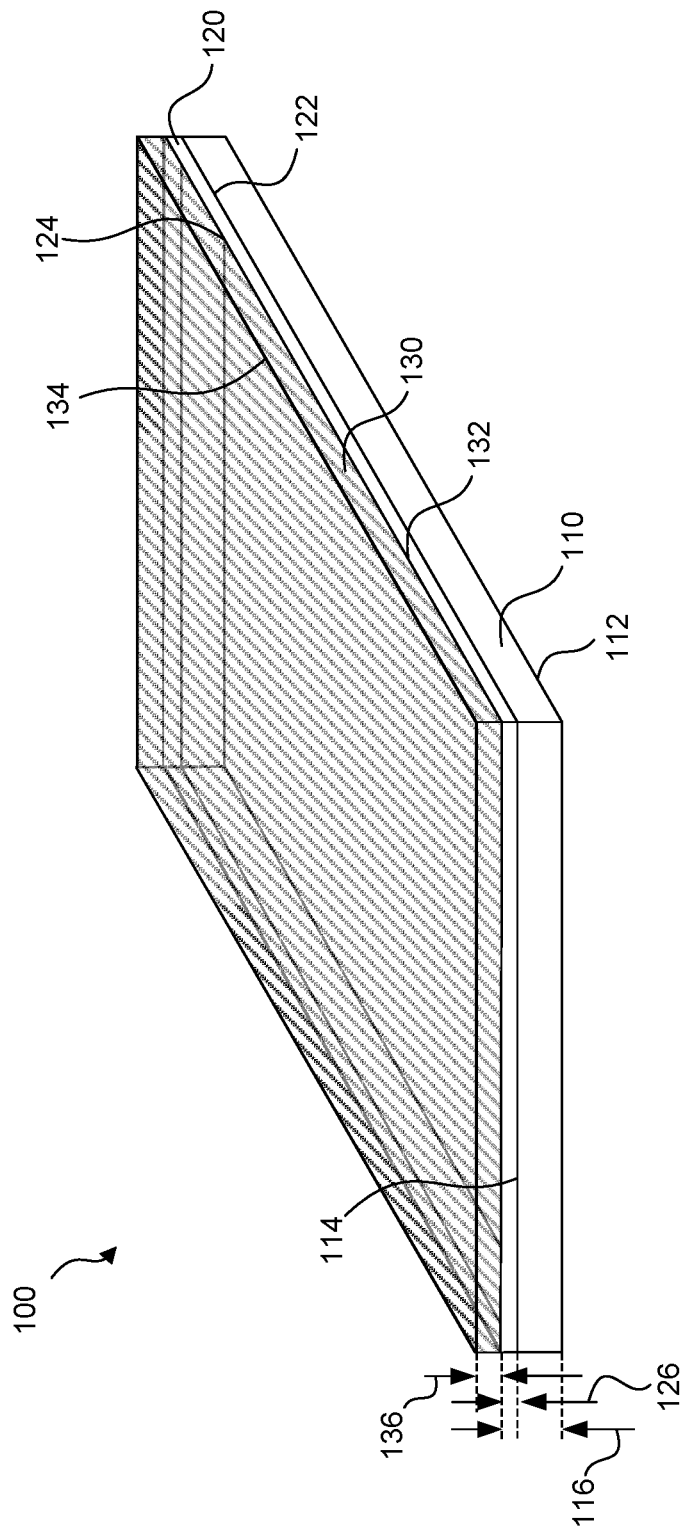
FIG. 1A illustrates a glass article according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Cover substrates for consumer products, for example cover glass, may serve to, among other things, reduce undesired reflections, prevent formation of mechanical defects in the glass (e.g., scratches or cracks), and/or provide an easy to clean transparent surface. The cover substrates disclosed herein may be incorporated into another article such as an article with a display (or display articles) (e.g., consumer electronic products, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance, or a combination thereof. An exemplary article incorporating any of the glass articles disclosed herein is a consumer electronic device including a housing having front, back, and side surfaces; electrical components that are at least partially inside or entirely within the housing and including at least a controller, a memory, and a display at or adjacent to the front surface of the housing; and a cover substrate at or over the front surface of the housing such that it is over the display. In some embodiments, the cover substrate may include any of the glass articles disclosed herein. In some embodiments, at least one of a portion of the housing or the cover substrate comprises a glass article disclosed herein.

Cover substrates, such as cover glasses, also serve to protect sensitive components of a consumer product from mechanical damage (e.g., puncture and impact forces). For consumer products including a flexible, foldable, and/or sharply curved portion (e.g., a flexible, foldable, and/or sharply curved display screen), a cover substrate for protecting the display screen should preserve the flexibility, foldability, and/or curvature of the screen while also protecting the screen. Moreover, the cover substrate should resist mechanical damage, such as scratches and fracturing, so that a user can enjoy an unobstructed view of the display screen.

Thick monolithic glass substrates may provide adequate mechanical properties, but these substrates can be bulky and difficult to fold to tighter radii in order to be utilized in foldable, flexible, or sharply curved consumer products. And highly flexible cover substrates, such a plastic substrates, may be unable to provide adequate puncture resistance, scratch resistance, and/or fracture resistance desirable for consumer products.

As a cover substrate, glass provides superior barrier to moisture (and oxygen) properties and hardness properties to minimize scratch and deformation damage during use. And ultra-thin glass can be bent to very small bending radii. However, glass, and particularly ultra-thin glass, may be susceptible to fracture from impact and/or puncture forces. Adding a polymeric layer to a top surface (user-facing surface) of a glass layer may increase the impact and puncture resistance of the glass layer. The polymeric layer added to a top surface of the glass layer may increase the impact and puncture resistance without jeopardizing transparency and bendability (flexibility) of the glass. However, the polymeric layer may require an additional scratch resistant coating to prevent formation of surface scratches during use.

Glass articles described herein include a glass layer (e.g., an ultra-thin glass layer) and an optically transparent polymeric hard-coat layer bonded to the glass layer. The transparent polymeric hard-coat layer not only increases puncture and impact resistance of the glass layer but also has high scratch resistance (hardness). By providing both puncture and/or impact resistance and high scratch resistance, the polymeric hard-coat layer may reduce the number of layers to manufacture a flexible cover substrate capable of adequately protecting sensitive components of a consumer product from mechanical damage during use. And by decreasing the number of layers to adequately protect sensitive components of a consumer product, the single hard-coat layer reduces the formations of stress between layers of a cover substrate, which can contribute to failure of a cover substrate. Further, decreasing the number of layers eliminates inflexibility added by additional layers. By building the puncture resistance, impact resistance, and scratch resistance for protection of a consumer product into a single layer, the flexibility of a glass layer for a cover substrate can be maintained, and the cover substrate can be manufactured at low cost and with low chance of failure.

The transparent polymeric hard-coat layer discussed herein may be deposited on a surface of the glass layer directly (i.e., disposed on the glass) or made as a stand-alone layer (film) and bonded to the glass surface with a thin, optically transparent adhesive. Decreasing the adhesive thickness, or eliminating the adhesive, may increase the degree of puncture resistance provided by the transparent polymeric hard-coat layer.

FIG. 1 illustrates a glass article 100 according to some embodiments. Glass article 100 may include a glass layer 110, an optically transparent adhesive layer 120, and an optically transparent polymeric (OTP) hard-coat layer 130. In some embodiments, glass layer 110 may have a thickness 116, measured from a bottom surface 112 to a top surface 114 of glass layer 110, in a range of 200 micrometers (microns) to 1 micron, including subranges. For example, glass layer 110 may have a thickness 116 of 200 microns, 150 microns, 125 microns, 100 microns, 90 microns, 80 microns, 75 microns, 70 microns, 65 microns, 60 microns, 55 microns, 50 microns, 45 microns, 40 microns, 35 microns, 30 microns, 25 microns, 20 microns, 10 microns, 1 micron, or within a range having any two of these values as endpoints. For example, the glass layer 110 may have a thickness 116 of 10 microns to 100 microns, or from 15 microns to 100 microns, or from 20 microns to 100 microns, or from 25 microns to 100 microns, or from 30 microns to 100 microns, or from 35 microns to 100 microns, or from 40 microns to 100 microns, or from 45 microns to 100 microns, or from 50 microns to 100 microns, or from 55 microns to 100 microns, or from 60 microns to 100 microns, or from 65 microns to 100 microns, or from 70 microns to 100 microns, or from 75 microns to 100 microns, or from 80 microns to 100 microns, or from 85 microns to 100 microns, or from 90 microns to 100 microns, or from 95 microns to 100 microns, or from 1 micron to 100 microns, or from 1 micron to 90 microns, or from 1 micron to 80 microns, or from 1 micron to 75 microns, or from 1 micron to 70 microns, or from 1 micron to 65 microns, or from 1 micron to 60 microns, or from 1 micron to 55 microns, or from 1 micron to 50 microns, or from 1 micron to 45 microns, or from 1 micron to 40 microns, or from 1 micron to 35 microns, or from 1 micron to 30 microns, or from 1 micron to 25 microns, or from 1 micron to 20 microns.

In some embodiments, glass layer 110 may have a thickness 116, in a range of 125 microns to 10 microns, for example 125 microns to 20 microns, or 125 microns to 30 microns, or 125 microns to 40 microns, or 125 microns to 50 microns, or 125 microns to 60 microns, or 125 microns to 70 microns, or 125 microns to 75 microns, or 125 microns to 80 microns, or 125 microns to 90 microns, or 125 microns to 100 microns. In some embodiments, glass layer 110 may have a thickness 116 in a range of 125 microns to 15 microns, for example 120 microns to 15 microns, or 110 microns to 15 microns, or 100 microns to 15 microns, or 90 microns to 15 microns, or 80 microns to 15 microns, or 70 microns to 15 microns, or 60 microns to 15 microns, or 50 microns to 15 microns, or 40 microns to 15 microns, or 30 microns to 15 microns. In some embodiments, glass layer 110 may have a thickness within a range having any two of the values discussed in this paragraph as endpoints.

In some embodiments, glass layer 110 may be an ultra-thin glass layer. As used herein, the term "ultra-thin glass layer" means a glass layer having a thickness 116 in a range of 75 microns to 1 micron, for example from 1 micron to 70 microns, or from 1 micron to 65 microns, or from 1 micron to 60 microns, or from 1 micron to 55 microns, or from 1 micron to 50 microns, or from 1 micron to 45 microns, or from 1 micron to 40 microns, or from 1 micron to 35 microns, or from 1 micron to 30 microns, or from 1 micron to 25 microns, or from 1 micron to 20 microns, or from 1 micron to 15 microns, or from 1 micron to 10 microns, or from 1 micron to 5 microns, or from 5 microns to 70 microns, or from 5 microns to 65 microns, or from 5 microns to 60 microns, or from 5 microns to 55 microns, or from 5 microns to 50 microns, or from 5 microns to 45 microns, or from 5 microns to 40 microns, or from 5 microns to 35 microns, or from 5 microns to 30 microns, or from 5 microns to 25 microns, or from 5 microns to 20 microns, or from 5 microns to 15 microns, or from 5 microns to 10 microns, or from 1 micron to 24 microns, or from 1 micron to 22 microns, or from 2 microns to 20 microns, or from 3 microns to 18 microns, or from 4 microns to 16 microns, or from 5 microns to 14 microns, or from 6 microns to 12 microns. In some embodiments, glass layer 110 may be a flexible glass layer. As used herein, a flexible layer or article is a layer or article having a bend radius, by itself, of less than or equal to 10 millimeters (mm). In some embodiments, glass layer 110 may be a non-strengthened glass layer, such as a glass layer that has not been subject to an ion-exchange process or a thermal tempering process.

Optically transparent adhesive layer 120 may be disposed on a surface of glass layer 110. In particular, optically transparent adhesive layer 120 may be disposed on top surface 114 of glass layer 110. As used herein, "disposed on" means that a first layer is in direct contact with a second layer. A first layer "disposed on" a second layer may be deposited, formed, placed, or otherwise applied directly onto the second layer. In other words, if a first layer is disposed on a second layer, there are no layers disposed between the first layer and the second layer. A first layer described as "bonded to" a second layer means that the layers are bonded directly to each other, either by direct contact and/or bonding between the two layers or via an adhesive layer. If a first layer is described as "disposed over" a second layer, other layers may or may not be present between the first layer and the second layer.

Suitable optically transparent adhesives for layer 120 include, but are not limited to acrylic adhesives, such as 3M™ 8212 adhesive, or any optically transparent liquid adhesive, such as a Loctite® optically transparent liquid adhesive. Optically transparent adhesive layer 120 may have a thickness 126, measured from a bottom surface 122 to a top surface 124 of optically transparent adhesive layer 120, in a range of 5 microns to 50 microns, including subranges. For example, thickness 126 of optically transparent adhesive layer 120 may be 5 microns, 10 microns, 15 microns, 20 microns, 25 microns, 30 microns, 35 microns, 40 microns, 45 microns, 50 microns, or within a range having any two of these values as endpoints. In some embodiments, thickness 126 may be in a range of 5 microns to 30 microns.

OTP hard-coat layer 130 is bonded to glass layer 110. In some embodiments, OTP hard-coat layer 130 may be disposed on optically transparent adhesive layer 120, which bonds OTP hard-coat layer 130 to glass layer 110. In such embodiments, OTP hard-coat layer 130 may be disposed on top surface 124 of optically transparent adhesive layer 120. In some embodiments, OTP hard-coat layer 130 may be disposed on (e.g., formed or deposited on) glass layer 110, and glass article 100 may not include optically transparent adhesive layer 120. In such embodiments, OTP hard-coat layer 130 may be disposed on top surface 114 of glass layer 110.

OTP hard-coat layer 130 may comprise an optically transparent material having a pencil hardness of 8H or more. Pencil hardness is measured by according to ASTM D3363. In some embodiments, OTP hard-coat layer 130 may comprise an optically transparent material having a pencil hardness of 9H or more. As used herein, "optically transparent" means an average transmittance of 70% or more in the wavelength range of 400 nanometers (nm) to 700 nm through a 1.0 mm thick piece of a material. In some embodiments, an optically transparent material may have an average transmittance of 75% or more, 80% or more, 85% or more, or 90% or more in the wavelength range of 400 nm to 700 nm through a 1.0 mm thick piece of the material. The average transmittance in the wavelength range of 400 nm to 700 nm is calculated by measuring the transmittance of all integer wavelengths from 400 nm to 700 nm and averaging the measurements.

In some embodiments, glass article 100 may be devoid of a layer having a pencil hardness greater than that of OTP hard-coat layer 130 and disposed over OTP hard-coat layer 130. In such embodiments, glass article 100 may include one or more layers disposed over OTP hard-coat layer 130 (e.g., coating layer 150, see FIG. 6), but any layers disposed over OTP hard-coat layer 130 do not have a hardness greater than that of OTP hard-coat layer 130.

Suitable materials for OTP hard-coat layer 130 include, but are not limited to, organic polymer materials, inorganic-organic hybrid polymeric materials, and aliphatic or aromatic hexafunctional urethane acrylates. In some embodiments, OTP hard-coat layer 130 may consist essentially of an organic polymer material, an inorganic-organic hybrid polymeric material, or aliphatic or aromatic hexafunctional urethane acrylate. In some embodiments, OTP hard-coat layer 130 may consist of an organic polymer material, an inorganic-organic hybrid polymeric material, or aliphatic or aromatic hexafunctional urethane acrylate.

As used herein, "organic polymer material" means a polymeric material comprising monomers with only organic components. In some embodiments, OTP hard-coat layer 130 may comprise an organic polymer material manufactured by Gunze Limited and having a hardness of 9H, for example Gunze's "Highly Durable Transparent Film." As used herein, "inorganic-organic hybrid polymeric material" means a polymeric material comprising monomers with inorganic and organic components. An inorganic-organic hybrid polymer is obtained by a polymerization reaction between monomers having an inorganic group and an organic group. An inorganic-organic hybrid polymer is not a nanocomposite material comprising separate inorganic and organic constituents or phases, such as for example inorganic particulate dispersed within an organic matrix.

In some embodiments, the inorganic-organic hybrid polymeric material may include polymerized monomers comprising an inorganic silicon-based group, for example, a silsesquioxane polymer. A silsesquioxane polymer may be, for example, an alky-silsesquioxane, an aryl-silsesquioxane, or an aryl alkyl-silsesquioxane having the following chemical structure: $(RSiO_{1.5})n$, where R is an organic group such as, but not limited to, methyl or phenyl. In some embodiments, OTP hard-coat layer 130 may comprise a silsesquioxane polymer combined with an organic matrix, such as for example, SILPLUS manufactured by Nippon Steel Chemical Co., Ltd.

In some embodiments, OTP hard-coat layer 130 may comprise 90 weight percent (wt %) to 95 wt % aromatic hexafunctional urethane acrylate (e.g., PU662NT (Aromatic hexafunctional urethane acrylate) manufactured by Miwon Specialty Chemical Co.) and 10 wt % to 5 wt % photo-initiator (e.g., Darocur 1173 manufactured by Ciba Specialty Chemicals Corporation) with a hardness of 8H or more. In some embodiments, an OTP hard-coat layer 130 comprising an aliphatic or aromatic hexafunctional urethane acrylate may be formed as a stand-alone layer by spin-coating the layer on a polyethylene terephthalate (PET) substrate, curing the urethane acrylate, and removing the urethane acrylate layer from the PET substrate.

OTP hard-coat layer 130 may have a thickness 136, measured from a bottom surface 132 to a top surface 134 of OTP hard-coat layer 130, in a range of 10 microns to 120 microns, including subranges. For example, thickness 136 of OTP hard-coat layer 130 may be 10 microns, 20 microns, 30 microns, 40 microns, 50 microns, 60 microns, 70 microns, 80 microns, 90 microns, 100 microns, 110 microns, 120 microns, or within a range having any two of these values as endpoints. For example the thickness 136 may be from 10 microns to 115 microns, or from 10 microns to 110 microns, or from 10 microns to 100 microns, or from 10 microns to 90 microns, or from 10 microns to 80 microns, or from 10 microns to 70 microns, or from 10 microns to 60 microns, or from 10 microns to 50 microns, or from 10 microns to 40 microns, or from 10 microns to 30 microns, or from 10 microns to 20 microns.

In some embodiments, OTP hard-coat layer 130 may be a single monolithic layer. As used herein, "single monolithic layer" means a single integrally formed layer having a generally consistent composition across its volume. A layer that is made by layering one or more layers or materials, or by mechanically attaching different layers, is not considered a single monolithic layer.

In some embodiments, OTP hard-coat layer 130 may be an inorganic-organic hybrid polymeric material layer or an organic polymer material layer having a thickness 136 in a range of 80 microns to 120 microns, including subranges. For example, an OTP hard-coat layer 130 comprising an inorganic-organic hybrid polymeric material or an organic polymer material may have a thickness 136 of 80 microns, 90 microns, 100 microns, 110 microns, 120 microns, or within a range having any two of these values as end points. In some embodiments, OTP hard-coat layer 130 may be an aliphatic or aromatic hexafunctional urethane acrylate material layer having a thickness 136 in a range of 10 microns to 60 microns, including subranges. For example, an OTP hard-coat layer 130 comprising an aliphatic or aromatic hexafunctional urethane acrylate material may have a thickness 136 of 10 microns, 20 microns, 30 microns, 40 microns, 50 microns, 60 microns, or within a range having any two of these values as end points.

In some embodiments, top surface 134 of OTP hard-coat layer 130 may be a topmost exterior, user-facing surface of glass article 100. In some embodiments, top surface 134 of OTP hard-coat layer 130 may be a topmost exterior, user-facing surface of a cover substrate defined by or including glass article 100. As used herein, the terms "top surface" or "topmost surface" and "bottom surface" or "bottommost surface" reference the top and bottom surface of a layer or article as is would be oriented on a device during its normal and intended use with the top surface being the user-facing surface. For example, when incorporated into a hand-held consumer electronic product having an electronic display, the "top surface" of a glass article refers to the top surface of that article as it would be oriented when held by a user viewing the electronic display through the glass article.

In some embodiments, top surface 134 of OTP hard-coat layer 130 may be coated with one or more coating layers (e.g., coating layer 150, see FIG. 6) to provide desired characteristics. Such coating layers include, but are not limited to, anti-reflection coating layers, anti-glare coating layers, anti-fingerprint coating layers, anti-microbial and/or anti-viral coating layers, and easy-to-clean coating layers.

Figure 1B:
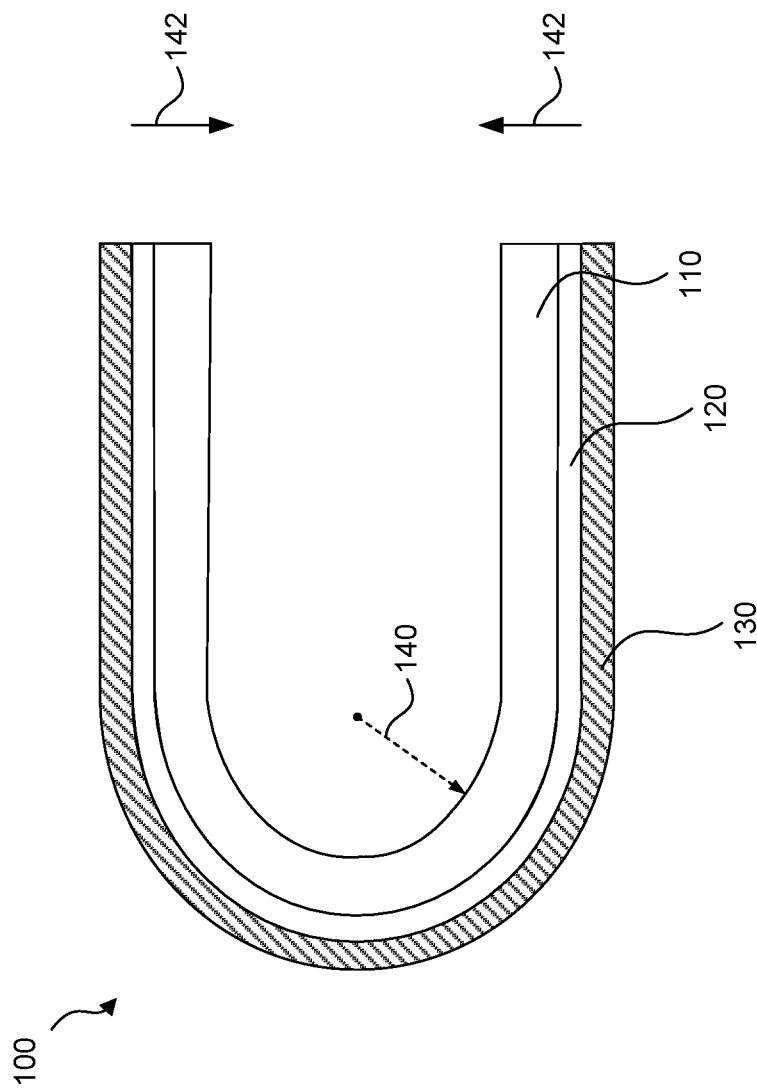
FIG. 1B illustrates a cross-sectional view of the glass article of FIG. 1A upon bending of the article.

In some embodiments, glass article 100 may have a bend radius 140 of 5 mm or less. In some embodiments, glass article 100 may have a bend radius 140 of 4 mm or less. In some embodiments, glass article 100 may have a bend radius 140 of 3 mm or less. Glass article 100 achieves (or survives) a bend radius of "X" (140) if it resists failure when glass article 100 is held at "X" radius for 60 minutes at about 25° C. and about 50% relative humidity. FIG. 1B illustrates the bending force 142 applied to glass article 100 to bend it to bend radius 140.

In some embodiments, glass article 100 may have an impact resistance defined by the capability of glass article 100 to avoid failure at a pen drop height that is "Y" times or more than that of a control pen drop height of a glass layer 110 without an OTP hard-coat layer 130. In some embodiments, "Y" may be 2. In some embodiments, "Y" may be 3. In some embodiments, "Y" may be 4. The pen drop height and the control pen drop height are measured according to the following "Pen Drop Test."

As described and referred to herein, "the Pen Drop Test" is conducted such that samples of glass articles are tested with the load (i.e., from a pen dropping at a certain height) imparted to a surface of a glass article with the opposite surface of the glass article bonded to a 100 micron thick layer of polyethylene terephthalate (PET) with a 50 micron thick optically transparent adhesive layer. The PTE layer in the Pen Drop Test is meant to simulate a flexible electronic display device (e.g., an OLED device). During testing, the glass article bonded to the PET layer is placed on an aluminum plate (6063 aluminum alloy, as polished to a surface roughness with 400 grit paper) with the PET layer in contact with the aluminum plate. No tape is used on the side of the sample resting on the aluminum plate.

A tube is used for the Pen Drop Test to guide a pen to the sample, and the tube is placed in contact with the top surface of the sample so that the longitudinal axis of the tube is substantially perpendicular to the top surface of the sample. The tube has an outside diameter of 2.54 cm (1 inch), an inside diameter of 1.4 cm (nine sixteenths of an inch) and a length of 90 cm. An acrylonitrile butadiene ("ABS") shim is employed to hold the pen at a desired height for each test. After each drop, the tube is relocated relative to the sample to guide the pen to a different impact location on the sample. The pen employed in the Pen Drop Test is a BIC® Easy Glide Pen, Fine, having a tungsten carbide ball point tip of 0.7 mm diameter, and a weight of 5.73 grams including the cap (4.68 g without the cap).

For the Pen Drop Test, the pen is dropped with the cap attached to the top end (i.e., the end opposite the tip) so that the ball point can interact with the test sample. In a drop sequence according to the Pen Drop Test, one pen drop is conducted at an initial height of 1 cm, followed by successive drops in 1 cm increments up to 20 cm, and then after 20 cm, 2 cm increments until failure of the test sample. After each drop is conducted, the presence of any observable fracture, failure or other evidence of damage to the glass article is recorded along with the particular pen drop height. Using the Pen Drop Test, multiple samples can be tested according to the same drop sequence to generate a population with improved statistics. For the Pen Drop Test, the pen is to be changed to a new pen after every 5 drops, and for each new sample tested. In addition, all pen drops are conducted at random locations on the sample at or near the center of the sample, with no pen drops near or on the edge of the samples.

For purposes of the Pen Drop Test, and testing bend radius, "failure" means the formation of a visible mechanical defect in a glass article. The mechanical defect may be a crack or plastic deformation (e.g., surface indentation). The crack may be a surface crack or a through crack (i.e., a crack extending from one major surface through to the opposite major surface). The crack may be formed on an interior or exterior surface of a glass article. The crack may extend through all or a portion of the layers of a glass article. A visible mechanical defect has minimum dimension of 0.2 millimeters or more.

Figure 3:
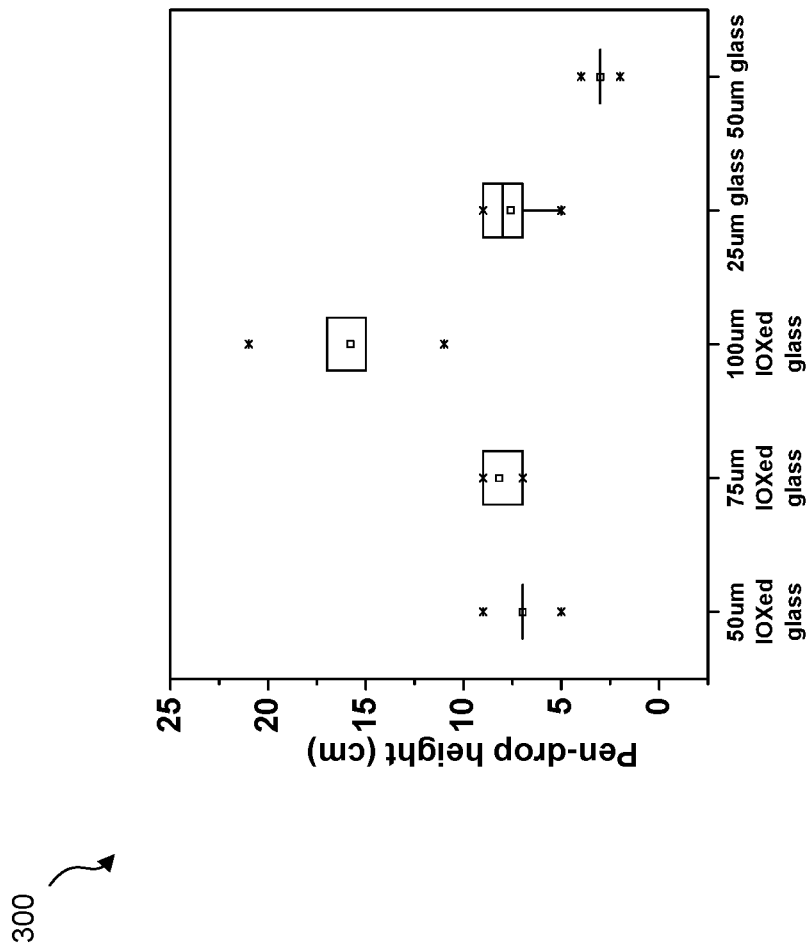
FIG. 3 is a graph of pen drop performances for various test samples having the first test sample configuration of FIG. 2A.
Figure 4:
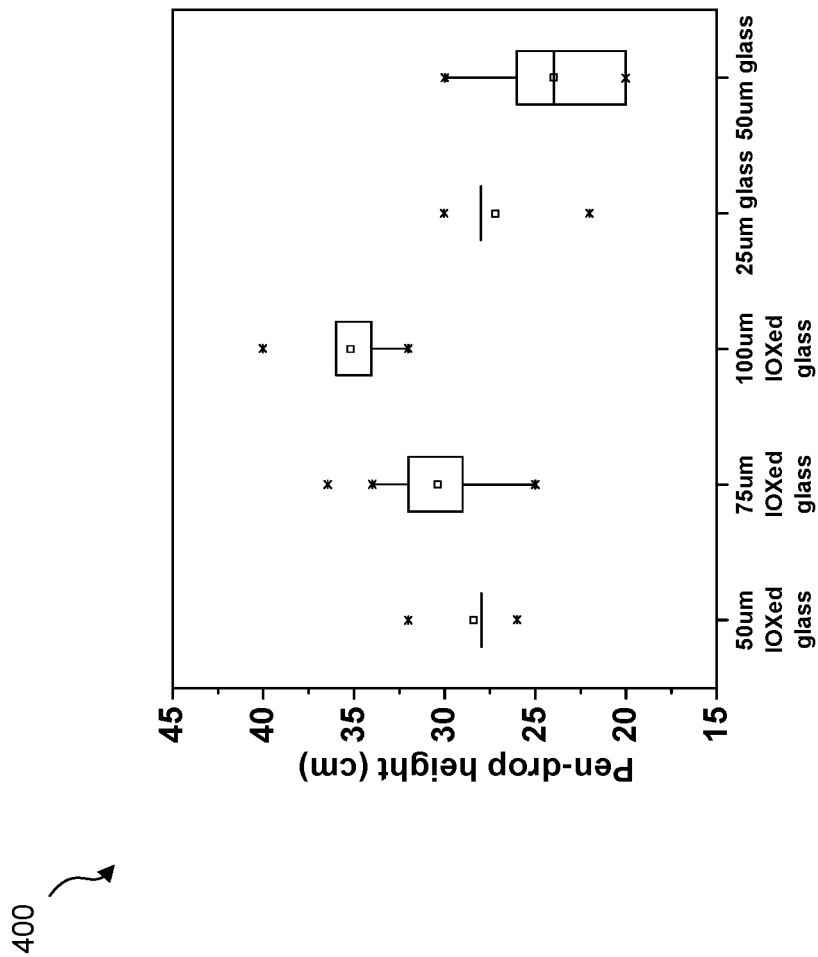
FIG. 4 is a graph of pen drop performances for various test samples having the second test sample configuration of FIG. 2B
Figure 5:
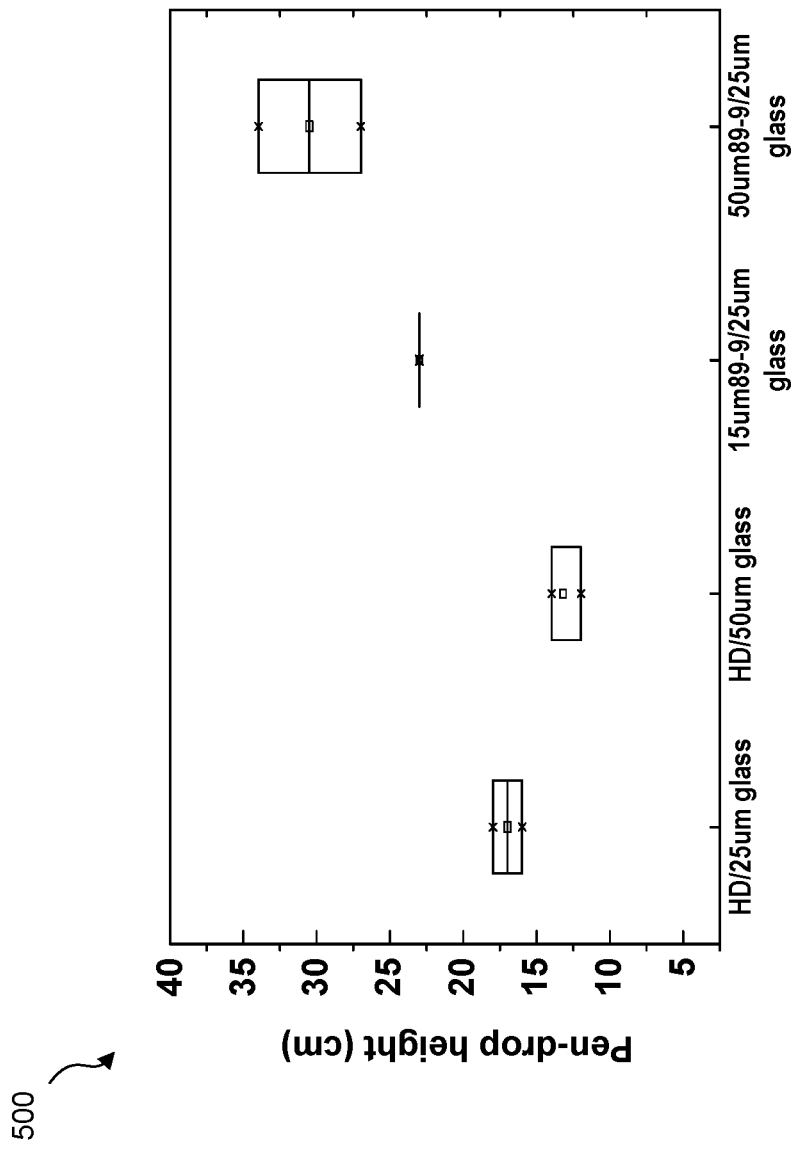
FIG. 5 is a graph of pen drop performances for various test samples having the third test sample configuration of FIG. 2C.

FIGS. 3-5 show impact test results for various samples tested with the Pen Drop Test. FIG. 3 shows a graph of pen drop performance in centimeters (cm) for various test samples 200 of FIG. 2A. FIG. 4 is a graph of pen drop performance in centimeters for various test samples 202 of FIG. 2B. FIG. 5 is a graph of pen drop performance in centimeters for various test samples 204 of FIG. 2C. For each impact test, 5 samples of each sample type reported in FIGS. 3-5 were tested under the same conditions.

Test samples 200 include a 100 micron thick PET layer 210 and a glass layer 230 bonded to PET layer 210 with a 50 micron thick optically transparent adhesive layer 220. As shown in FIG. 3, five different types of glass layers 230 for samples 200 were tested with the Pen Drop Test: (a) 50 micron thick chemically strengthened glass (50 um IOXed glass), (b) 75 micron thick chemically strengthened glass (75 um IOXed glass), 100 micron thick chemically strengthened glass (100 um IOXed glass), (d) 25 micron thick glass, and (e) 50 micron thick glass. The test results for samples 200 show that impact resistance for an uncoated glass layer 230 is dependent on glass thickness. For the chemically strengthened glass layers 230, increased thickness resulted in superior impact performance. For the non-chemically strengthened glass, increased thickness resulted in inferior impact performance.

As shown by the test results for test samples 202 in FIG. 4, when a polyimide layer 250 is bonded to the top surface of a glass layer 230, the pen-drop performance in the Pen Drop Test increases compared to test samples 200. Test samples 202 include a 100 micron thick PET layer 210, a glass layer 230 bonded to PET layer 210 with a 50 micron thick optically transparent adhesive layer 220, and a 50 micron thick polyimide layer 250 bonded to glass layer 230 with a 25 micron thick optically transparent adhesive layer 240. Again, five different types of glass layers 230 for samples 202 were tested with the Pen Drop Test: (a) 50 um IOXed glass, (b) 75 um IOXed glass, (c) 100 um IOXed glass, (d) 25 um thick glass, and (e) 50 um micron thick glass. The test results for samples 202 show that impact resistance for all samples tested have 2 to 8 times higher pen drop height performance with a polyimide film added when compared to their counter-part sample 200. For the non-strengthened glass samples, the 25 um glass samples 202 showed approximately 3 times higher pen drop performance compared to the 25 um glass samples 200. And the 50 um glass samples 202 showed approximately 8 times higher pen drop performance compared to the 50 um glass samples 200

The test results in FIGS. 3 and 4 indicate that the bottom surface of the glass layer 230 in the samples 200 and 202 experiences the greatest stress during impact and results in failure of samples 200 and 202. Adding a polyimide layer 250 to the top surface of a glass layer 230 reduces the stress on the bottom surface of glass layer 230, resulting in an increase in pen drop failure height.

While polyimide layer 250 improves the impact resistance of a glass article, polyimide is not hard enough to serve as a scratch-resistant material for the topmost user-facing surface of a cover substrate for a consumer product (e.g., flexible electronic devices or wearable electronic devices). Further, modeling indicates that an adhesive layer having a thickness of 30 microns or less may improve pen drop performance by mitigating deformation of a polymeric coating layer. Therefore, polymer film layers with higher hardness than polyimide and a thin adhesive layer (e.g., 30 microns or less in thickness) used to bond such films to a glass layer may provide adequate puncture and/or impact resistance and scratch resistance for a cover substrate. The combination of high hardness and high impact and/or puncture resistance means that such high hardness polymeric films can be used as a single-layer protection layer for cover substrates for consumer products.

As shown by the test results for test samples 204 in FIG. 5, when an OTP hard-coat layer 260 according to embodiments discussed herein is bonded to the top surface of a glass layer 230, the pen-drop performance in the Pen Drop Test increases compared to test samples 200. Test samples 204 include a 100 micron thick PET layer 210, a glass layer 230 bonded to PET layer 210 with a 50 micron thick optically transparent adhesive layer 220, and an OTP hard-coat layer 260 bonded to glass layer 230 with a 10 micron thick optically transparent adhesive layer 240. Four different test sample 204 types were tested with the Pen Drop Test. (1) A 100 micron thick silsesquioxane OTP hard-coat layer manufactured by Gunze Limited bonded to a 25 micron thick glass layer (HD/25 um glass). (2) A 100 micron thick silsesquioxane OTP hard-coat layer manufactured by Gunze Limited bonded to a 50 micron thick glass layer (HD/50 um glass). (3) A 15 micron thick OTP hard-coat layer made with 95% PU662NT and 5% photo-initiator bonded to a 25 micron thick glass layer (15 um89-9/25 um glass). (4) A 50 micron thick OTP hard-coat layer made with 95% PU662NT and 5% photo-initiator bonded to a 25 micron thick glass layer (50 um89-9/25 um glass).

As illustrated by comparing samples 200 and 204 in FIGS. 3 and 5, bonding an HD OTP hard-coat layer 260 to the top surface of a glass layer 230 with optically transparent adhesive layer 240 increases the pen drop failure height by at least two for both the 25 um and 50 um glass samples. For the non-strengthened 25 um glass samples, the pen drop failure height increased more than two-fold. For the non-strengthened 50 um glass samples, the pen drop failure height increased more than four-fold. The HD OTP hard-coat layers 260 did not improve the pen drop performance of comparable glass layers as much as polyimide layers 250 due to polyimide's relatively soft, elastic characteristics. However, the HD OTP hard-coat layers 260 have a higher hardness than the polyimide layers 250 tested, and thus can be used as a scratch-resistant layer.

As also illustrated by comparing samples 200 and 204 in FIGS. 3 and 5, the samples 204 including PU662NT OTP hard-coat layers 260 showed even better pen drop performance than samples 204 including HD OTP hard-coat layers 260. For the non-strengthened 25 um glass samples 204, the pen drop failure height increased by more than three-fold compared to samples 200. For the non-strengthened 50 um glass samples 204, the pen drop failure height increased by about ten-fold compared to samples 200. Further, the samples 204 including PU662NT OTP hard-coat layers 260 performed statistically as good in the Pen Drop Tests as comparable samples 202 including polyimide layers 250. However, the PU662NT OTP hard-coat layers 260 have a higher hardness than the polyimide layers 250 tested, and thus can be used as a scratch-resistant layer.

Figure 6:
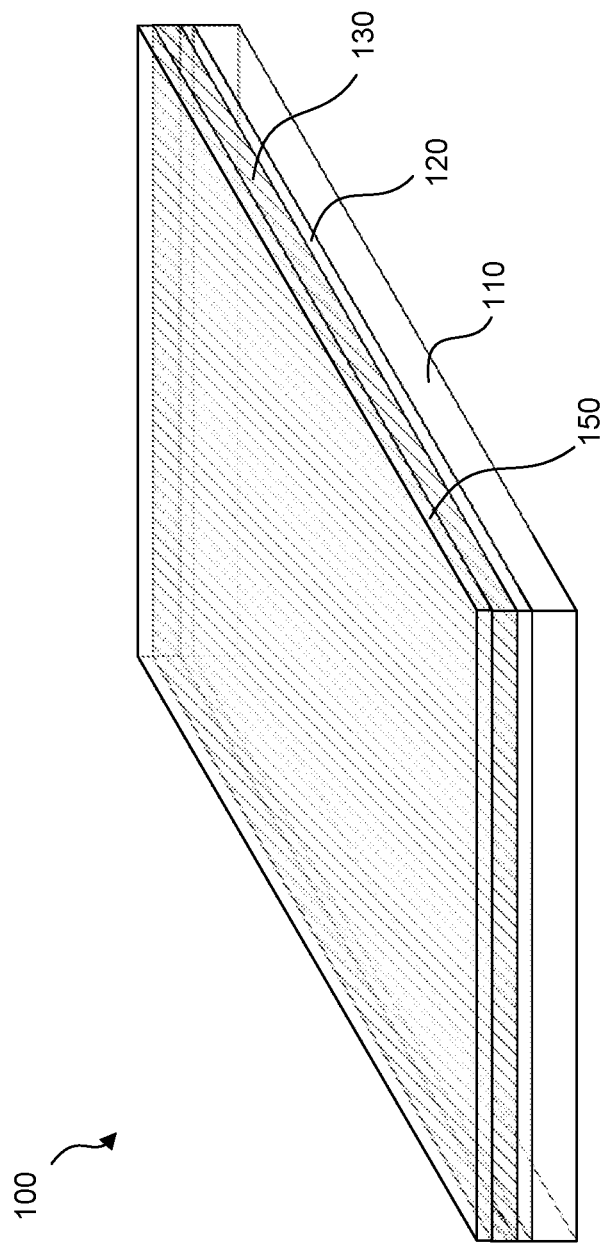
FIG. 6 illustrates a glass article including a coating layer according to some embodiments.

In some embodiments, for example as shown in FIG. 6, glass article 100 may be coated with a coating layer 150. Coating layer 150 may disposed on top surface 134 of OTP hard-coat layer 130. In some embodiments, multiple coating layers 150, of the same or different types, may be coated on a glass article 100.

In some embodiments, coating layer(s) 150 may be an anti-reflection coating layer. Exemplary materials suitable for use in the anti-reflection coating layer include: SiO2, $Al_2O_3$, $GeO_2$, SiO, $AlO_xN_y$, AlN, $SiN_x$, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, and other materials cited above as suitable for use in a scratch resistant layer. An anti-reflection coating layer may include sub-layers of different materials.

In some embodiments, the anti-reflection coating layer may include a hexagonally packed nanoparticle layer, for example but not limited to, the hexagonally packed nanoparticle layers described in U.S. Pat. No. 9,272,947, issued Mar. 1, 2016, which is hereby incorporated by reference in its entirety by reference thereto. In some embodiments, the anti-reflection coating layer may include a nanoporous Si-containing coating layer, for example but not limited to the nanoporous Si-containing coating layers described in WO2013/106629, published on Jul. 18, 2013, which is hereby incorporated by reference in its entirety by reference thereto. In some embodiments, the anti-reflection coating may include a multilayer coating, for example, but not limited to the multilayer coatings described in WO2013/106638, published on Jul. 18, 2013; WO2013/082488, published on Jun. 6, 2013; and U.S. Pat. No. 9,335,444, issued on May 10, 2016, all of which are hereby incorporated by reference in their entirety by reference thereto.

In some embodiments, coating layer(s) 150 may be an easy-to-clean coating layer. In some embodiments, the easy-to-clean coating layer may include a material selected from the group consisting of fluoroalkylsilanes, perfluoropolyether alkoxy silanes, perfluoroalkyl alkoxy silanes, fluoroalkylsilane-(non-fluoroalkylsilane) copolymers, and mixtures of fluoroalkylsilanes. In some embodiments, the easy-to-clean coating layer may include one or more materials that are silanes of selected types containing perfluorinated groups, for example, perfluoroalkyl silanes of formula $(R_F)_y Si_{X4-y}$, where RF is a linear $C6$-$C_{30}$ perfluoroalkyl group, X=Cl, acetoxy, —$OCH_3$, and —$OCH_2CH_3$, and y=2 or 3. The perfluoroalkyl silanes can be obtained commercially from many vendors including Dow-Corning (for example fluorocarbons 2604 and 2634), 3MCompany (for example ECC-1000 and ECC-4000), and other fluorocarbon suppliers such as Daikin Corporation, Ceko (South Korea), Cotec-GmbH (DURALON UltraTec materials) and Evonik. In some embodiments, the easy-to-clean coating layer may include an easy-to-clean coating layer as described in WO2013/082477, published on Jun. 6, 2013, which is hereby incorporated by reference in its entirety by reference thereto.

In some embodiments, coating layer(s) 150 may be an anti-glare layer formed on top surface 134 of OTP hard-coat layer 130. Suitable anti-glare layers include, but are not limited to, the anti-glare layers prepared by the processes described in U.S. Pat. Pub. Nos. 2010/0246016, 2011/0062849, 2011/0267697, 2011/0267698, 2015/0198752, and 2012/0281292, all of which are hereby incorporated by reference in their entirety by reference thereto.

In some embodiments, coating layer(s) 150 may be an anti-fingerprint coating layer. Suitable anti-fingerprint coating layers include, but are not limited to, oleophobic surface layers including gas-trapping features, as described in, for example, U.S. Pat. App. Pub. No. 2011/0206903, published Aug. 25, 2011, and oleophilic coatings formed from an uncured or partially-cured siloxane coating precursor comprising an inorganic side chain that is reactive with the surface of the glass or glass-ceramic substrate (e.g., partially-cured linear alkyl siloxane), as described in, for example, U.S. Pat. App. Pub. No. 2013/0130004, published May 23, 2013. The contents of U.S. Pat. App. Pub. No. 2011/0206903 and U.S. Pat. App. Pub. No. 2013/0130004 are incorporated herein by reference in their entirety.

In some embodiments, coating layer(s) 150 may be an anti-microbial and/or anti-viral layer may be formed on top surface 134 of OTP hard-coat layer 130. Suitable anti-microbial and/or anti-viral layers include, but are not limited to, an antimicrobial Ag+ region extending from the surface of the glass article to a depth in the glass article having a suitable concentration of Ag+1 ions on the surface of the glass article, as described in, for example, U.S. Pat. App. Pub. No. 2012/0034435, published Feb. 9, 2012, and U.S. Pat. App. Pub. No. 2015/0118276, published Apr. 30, 2015. The contents of U.S. Pat. App. Pub. No. 2012/0034435 and U.S. Pat. App. Pub. No. 2015/0118276 are incorporated herein by reference in their entirety.

Figure 7:
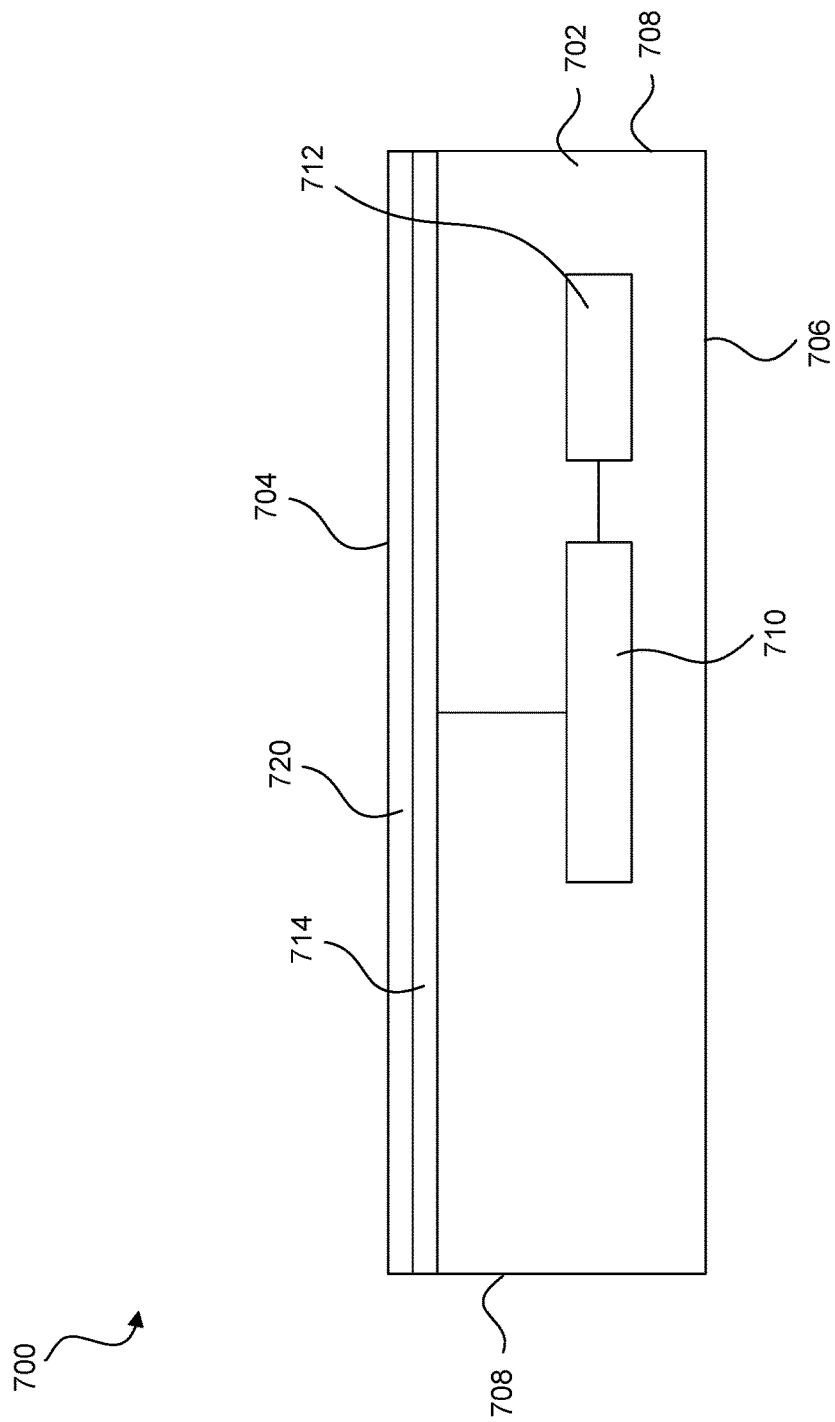
FIG. 7 illustrates a consumer product according to some embodiments.

FIG. 7 shows a consumer electronic product 700 according to some embodiments. Consumer electronic product 700 may include a housing 702 having a front (user-facing) surface 704, a back surface 706, and side surfaces 708. Electrical components may be provided at least partially within housing 702. The electrical components may include, among others, a controller 710, a memory 712, and display components, including a display 714. In some embodiments, display 714 may be provided at or adjacent to front surface 704 of housing 702. Display 714 may be, for example, a light emitting diode (LED) display or an organic light emitting diode (OLED) display.

As shown for example in FIG. 7, consumer electronic product 700 may include a cover substrate 720. Cover substrate 720 may serve to protect display 714 and other components of electronic product 700 (e.g., controller 710 and memory 712) from damage. In some embodiments, cover substrate 720 may be disposed over display 714. In some embodiments, cover substrate 720 may be bonded to display 714. In some embodiments, cover substrate 720 may be a cover glass defined in whole or in part by a glass article discussed herein. Cover substrate 720 may be a 2D, 2.5D, or 3D cover substrate. In some embodiments, cover substrate 720 may define front surface 704 of housing 702. In some embodiments, cover substrate 720 may define front surface 704 of housing 702 and all or a portion of side surfaces 708 of housing 702. In some embodiments, consumer electronic product 700 may include a cover substrate defining all or a portion of back surface 706 of housing 702.

As used herein the term "glass" is meant to include any material made at least partially of glass, including glass and glass-ceramics. "Glass-ceramics" include materials produced through controlled crystallization of glass. In embodiments, glass-ceramics have about 30% to about 90% crystallinity. Non-limiting examples of glass-ceramic systems that may be used include $Li_2O \times Al_2O_3 \times nSiO_2$ (i.e. LAS system), $MgO \times Al_2O_3 \times nSiO_2$ (i.e. MAS system), and $ZnO \times Al_2O_3 \times nSiO_2$ (i.e. ZAS system).

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate may include crystalline substrates such as glass-ceramic substrates (which may be strengthened or non-strengthened) or may include a single crystal structure, such as sapphire. In one or more specific embodiments, the substrate includes an amorphous base (e.g., glass) and a crystalline cladding (e.g., sapphire layer, a polycrystalline alumina layer and/or or a spinel ($MgAl_2O_4$) layer).

A substrate or layer may be strengthened to form a strengthened substrate or layer. As used herein, the terms "strengthened substrate" or "strengthened layer" may refer to a substrate and/or layer that has been chemically strengthened, for example through ion-exchange of larger ions for smaller ions in the surface of the substrate and/or layer. Other strengthening methods known in the art, such as thermal tempering, or utilizing a mismatch of the coefficient of thermal expansion between portions of the substrate and/or layer to create compressive stress and central tension regions, may also be utilized to form strengthened substrates and/or layers.

Where the substrate and/or layer is chemically strengthened by an ion exchange process, the ions in the surface layer of the substrate and/or layer are replaced by—or exchanged with—larger ions having the same valence or oxidation state. Ion exchange processes are typically carried out by immersing a substrate and/or layer in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate and/or layer in a salt bath (or baths), use of multiple salt baths, additional steps such as annealing, washing, and the like, are generally determined by the composition of the substrate and/or layer and the desired compressive stress (CS), depth of compressive stress layer (or depth of layer) of the substrate that result from the strengthening operation. By way of example, ion exchange of alkali metal-containing glass substrates and/or layers may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates and/or layers are immersed in multiple ion exchange baths, with washing and/or annealing steps between immersions, are described in U.S. patent application Ser. No. 14/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 14/500,650 and U.S. Pat. No. 8,312,739 are incorporated herein by reference in their entirety.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

The term "wherein" is used as an open-ended transitional phrase, to introduce a recitation of a series of characteristics of the structure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom, inward, outward—are made only with reference to the figures as drawn and are not intended to imply absolute orientation.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A glass article, comprising:
an ultra-thin glass layer;
an optically transparent adhesive layer disposed on the ultra-thin glass layer; and an optically transparent polymeric hard-coat layer disposed on the optically transparent adhesive layer, wherein the optically transparent polymeric hard-coat layer is a silsesquioxane polymer layer, an aliphatic hexafunctional urethane acrylate layer, or an aromatic hexafunctional urethane acrylate layer and the optically transparent polymeric hard-coat layer comprises:
a pencil hardness of 8H or more, and
a thickness in a range of 10 microns to 120 microns,
wherein the glass article comprises an impact resistance defined by the capability of the glass article to avoid failure at a pen drop height that is 2 times or more than that of a control pen drop height of the ultra-thin glass layer without the optically transparent polymeric hard-coat layer, wherein the pen drop height and the control pen drop height are measured according to the Pen Drop Test, and
wherein the glass article survives a bend radius of 5 mm or less.

2. The glass article of claim 1, wherein the glass article is devoid of a layer disposed over the optically transparent polymeric hard-coat layer having a pencil hardness greater than that of the optically transparent polymeric hard-coat layer.

3. The glass article of claim 1, wherein the pen drop height is 3 times or more than that of the control pen drop height of the ultra-thin glass layer without the optically transparent polymeric hard-coat layer, and wherein the glass article survives a bend radius of 3 mm or less.

4. The glass article of claim 1, wherein the optically transparent polymeric hard-coat layer defines a topmost exterior surface of the glass article.

5. The glass article of claim 1, wherein the optically transparent polymeric hard-coat layer comprises a thickness in a range of 80 microns to 120 microns.

6. The glass article of claim 1, wherein the optically transparent polymeric hard-coat layer is the aliphatic or aromatic hexafunctional urethane acrylate layer comprising a thickness in a range of 10 microns to 60 microns.

7. The glass article of claim 1, wherein the optically transparent adhesive layer comprises a thickness in a range of 5 microns to 30 microns.

8. A method of making a glass article, the method comprising:
disposing an optically transparent adhesive layer on an ultra-thin glass layer; and
disposing an optically transparent polymeric hard-coat layer on the optically transparent adhesive layer, wherein the optically transparent polymeric hard-coat layer is a silsesquioxane polymer layer, an aliphatic hexafunctional urethane acrylate layer, or an aromatic hexafunctional urethane acrylate layer and the optically transparent polymeric hard-coat layer comprises:
a pencil hardness of 8H or more, and
a thickness in a range of 10 microns to 120 microns,
wherein the glass article comprises an impact resistance defined by the capability of the glass article to avoid failure at a pen drop height that is 2 times or more than that of a control pen drop height of the ultra-thin glass layer without the optically transparent polymeric hard-coat layer, wherein the pen drop height and the control pen drop height are measured according to the Pen Drop Test, and
wherein the glass article survives a bend radius of 5 mm or less.

9. The method of claim 8, wherein the pen drop height is 3 times or more than that of the control pen drop height of the ultra-thin glass layer without the optically transparent polymeric hard-coat layer.

10. The method of claim 8, wherein the glass article is devoid of a layer disposed over the optically transparent polymeric hard-coat layer having a pencil hardness greater than that of the optically transparent polymeric hard-coat layer.

11. The method of claim 8, wherein the optically transparent polymeric hard-coat layer is the aliphatic hexafunctional urethane acrylate layer, or the aromatic hexafunctional urethane acrylate layer.

\* \* \* \* \*